Figure 1:
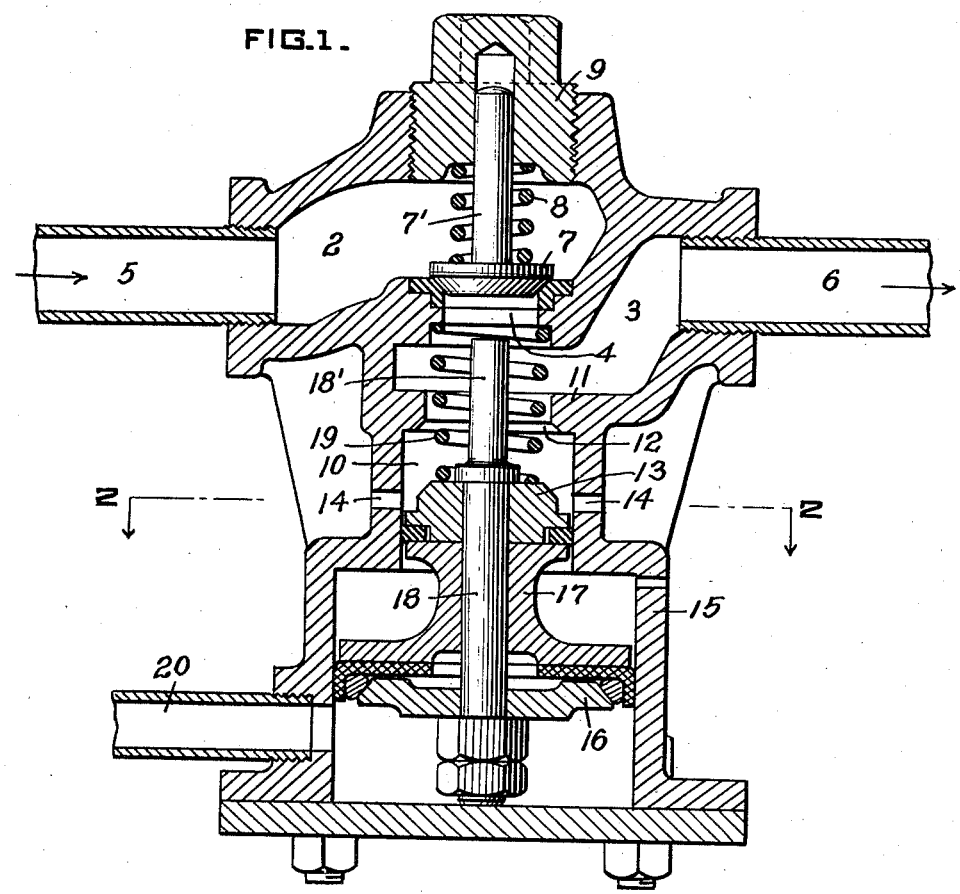

C. H. CLARK.
CONTROLLING VALVE.
APPLICATION FILED JAN. 18, 1917.

1,373,599.

Patented Apr. 5, 1921.

WITNESSES
J. Herbert Bradley
E. B. Molter

INVENTOR
Chas. H. Clark
By J. W. Herbert
Atty.

UNITED STATES PATENT OFFICE.

CHARLES H. CLARK, OF DORMONT, PENNSYLVANIA.

CONTROLLING-VALVE.

1,373,599.     Specification of Letters Patent.     Patented Apr. 5, 1921.

Application filed January 18, 1917. Serial No. 143,083.

*To all whom it may concern:*

Be it known that I, CHARLES H. CLARK, a citizen of the United States, and resident of Dormont, in the county of Allegheny and State of Pennsylvania, have invented certain new and useful Improvements in Controlling-Valves, of which the following is a specification.

In various types of apparatus actuated by compressed air, and particularly apparatus that operates intermittently, it is desirable to vent the motor cylinder or other com to the compressed air actuated device to the atmosphere when the mechanism is inactive, thereby preventing accidental or premature operation that might result from a leak in the mechanism controlling the passage of air to such cylinder or other motor device.

The object of this invention is to provide a controlling valve wherein the flow of compressed air from a supply line to a power line is controlled by a valve mechanism of novel construction wherein communication between the two lines is controlled by a normally closed valve, with the power line and the delivering side of the valve normally freely vented to the atmosphere. The actuating means for the valve operates to close the outlet to the atmosphere when opening the valve and to open such outlet when permitting the valve to close, thereby insuring the desired venting whenever the flow controlling valve is closed. The invention is preferably embodied in a mechanism wherein said valve and a valve for closing and opening the outlets to the atmosphere are actuated by compressed air through the medium of a cylinder and piston, whereby the operation may be controlled at a distance.

An advantageous use for valve mechanism of the character indicated is for controlling the operation of dump cars wherein compressed air is utilized as a motive force in the dumping operation, for instance as in Letters Patent granted to me May 9, 1916, No. 1,182,643, wherein power cylinders are utilized for moving a car body to dumping position. In such use the improved valve mechanism precludes accidental or premature movement of the car body, the power line, *i. e.*, the line through which air is supplied to the cylinders, being vented to the atmosphere automatically with shutting off the flow of air from a source of supply, whether the latter be a train line or a reservoir. Also, in such use the compressed air line for actuating the controlling valve mechanism may be controlled at the locomotive or other central point, whereby air may be admitted to such line for simultaneously actuating the controlling valves on all the cars of a train. Or the arrangement may be such as to separately operate each valve, the present invention not being concerned with any particular means for controlling the flow of air for energizing the valve mechanism. It will of course be understood that the improved mechanism may be variously utilized; also that it may be used for controlling the flow of fluids other than air.

Figure 2:
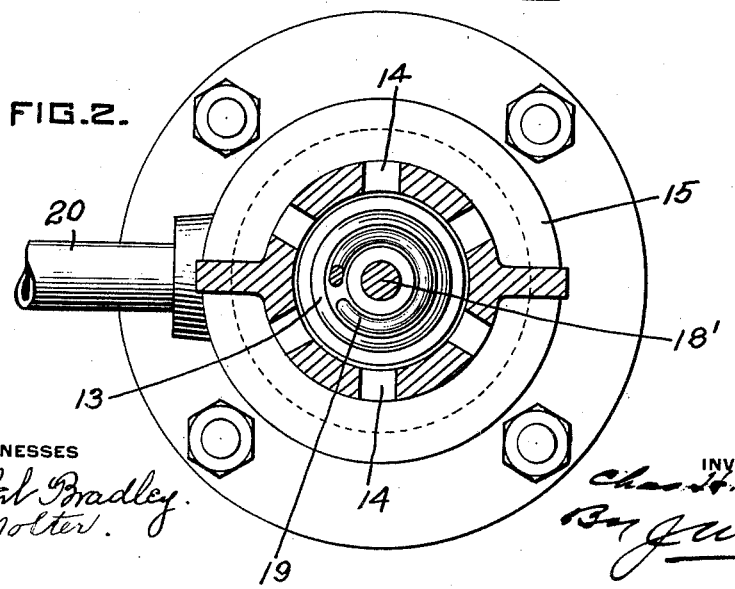

In the accompanying drawings, Figure 1 is a sectional elevation of a valve mechanism embodying the invention, and Fig. 2 is a sectional plan on line 2—2 of Fig. 1.

Referring to the drawings, the entire casing and cylinder structure is preferably embodied in a single casting having in the upper portion thereof a receiving chamber 2 and delivering chamber 3, connected by port 4 which is preferably located at the longitudinal center of the casing. A supply line 5 leads to chamber 2 from any suitable source of compressed air whereby the latter is constantly maintained in said chamber. Leading from chamber 3 is the power line 6 through which compressed air is supplied from chamber 3 to a power cylinder or other compressed air actuated mechanism, not shown. Port 4 is controlled by valve 7 which is actuated in chamber 2 by spring 8 to close toward delivering chamber 3, stem 7' of the valve being movable in the guide-forming plug 9 which closes the top of the casing.

Delivering chamber 3 is separated from the vent chamber 10 by wall or partition 11 which is ported in line with port 4 and provides a seat 12 for valve 13 which is operative in chamber 10 for closing ports 14 of the latter to the atmosphere. Communicating with and forming an extension to chamber 10 is cylinder 15, and movable in the latter is piston 16 having the reduced head portion 17 entered in chamber 10 and to which valve 13 is secured. A stem 18 extends from the piston and through head 17 and valve 13, being conveniently utilized for securing together said head and valve. The extended portion 18' of the stem projects into delivering chamber 3 and is in line axially with valve 7 and stem 7' thereof. The piston and its stem are held normally depressed by coiled spring 19 as in Fig. 1 with vents 14 maintaining chambers 3 and 10 in communication with the atmosphere. In such position stem 18' is spaced from valve 7 as shown.

A compressed air line 20 is connected to cylinder 15 at the outer side of piston 16, this line being extended from a convenient point where the flow of compressed air to and from said line may be advantageously controlled. Upon the admission of air to line 20, piston 16 operates to close vents 14 and to move valve 13 to seat 12 and thereby close communication between chambers 3 and 10. The same movement of the piston engages stem 18 with and unseats valve 7 against the air pressure thereon in chamber 2 and against the pressure of spring 8, thereby establishing free communication through port 4 between receiving chamber 2 and delivering chamber 3 and permitting a free flow of air through power line 6. Upon releasing the air pressure on piston 16, the latter and its stem are returned to normal position by spring 19, and valve 7 is immediately closed, thereby restoring the parts to position shown in Fig. 1, the discharge of air from chamber 2 being shut off, and delivering chamber 3 being vented to the atmosphere and so remaining until the mechanism is again operated. Leakage through valve 7 is released through vents 14 and can have no possible effect on power line 6.

I claim:

A control casing inclosing a cylinder having an atmospheric vent port formed therein, a receiving chamber, and a discharge chamber normally communicating with said vent port, a valve for controlling communication between said chambers, a spring for normally closing said valve, a differential piston located in said cylinder and movable, in response to fluid pressure delivered to said cylinder, to close said vent port, a stem carried by said piston for engaging said valve to open the same after said vent port is closed, and a spring between a stationary portion of the casing and said piston for accumulatively resisting the valve opening movement of said piston independently of the position of said valve.

In testimony whereof I affix my signature in presence of two witnesses.

CHARLES H. CLARK.

Witnesses:
J. M. NESBIT,
ALEX. S. MABON.